Figure 1:
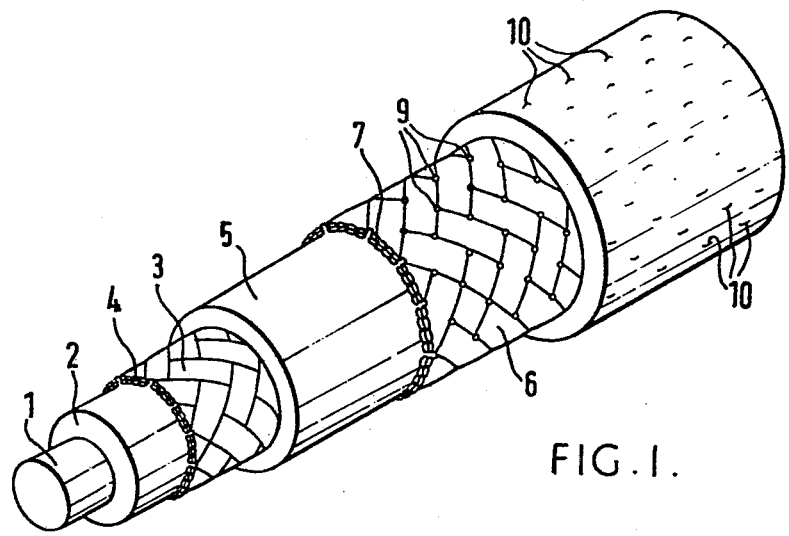

United States Patent [19]

Taylor

[11] 4,102,724
[45] Jul. 25, 1978

[54] METHOD OF MAKING A HOSE HAVING AN IMPROVED SURFACE APPEARANCE

[75] Inventor: Challen E. Taylor, Portadown, Northern Ireland

[73] Assignee: The Goodyear Tire & Rubber Company, Akron, Ohio

[21] Appl. No.: 671,799

[22] Filed: Mar. 30, 1976

[30] Foreign Application Priority Data

May 12, 1975 [GB] United Kingdom ............... 19918/75

[51] Int. Cl.² ............................................. F16L 1/04
[52] U.S. Cl. .................... 156/149; 138/121; 138/123; 138/137; 138/141; 156/172; 156/257
[58] Field of Search ............... 156/143, 144, 148, 149, 156/156, 184, 187, 257, 138, 172, 173, 267, 294, 298; 138/121, 123, 126, 137, 141

[56] References Cited

U.S. PATENT DOCUMENTS

| | | | |
|---|---|---|---|
| 2,439,043 | 4/1948 | Evans | 156/298 |
| 2,652,093 | 9/1953 | Burton | 138/137 |
| 3,008,860 | 11/1961 | Balkin et al. | 156/298 |
| 3,168,910 | 2/1965 | Galloway et al. | 138/121 |
| 3,599,677 | 8/1971 | O'Brien | 138/121 |
| 3,814,138 | 6/1974 | Courtot | 138/137 |

FOREIGN PATENT DOCUMENTS 674,898  6/1952  United Kingdom ................ 156/149

*Primary Examiner*—Caleb Weston
*Attorney, Agent, or Firm*—L. A. Germain

[57] ABSTRACT

A vulcanized reinforced elastomeric hose and a method for its production wherein a layer of uncured rubber supported on a mandrel is surrounded by reinforcement filaments and thereafter vulcanized. In the same method of the invention recesses are provided in the surface of the uncured rubber beneath the reinforcement filaments to accommodate expansion of the mandrel and/or expansion of the uncured rubber and/or shrinkage of the filaments and thereby prevent rubber from being exuded above the reinforcement filaments on curing.

7 Claims, 18 Drawing Figures

METHOD OF MAKING A HOSE HAVING AN IMPROVED SURFACE APPEARANCE

This invention relates to a vulcanized reinforced elastomeric hose and to a method for its production, more especially to such a method involving the use of a flexible polymeric mandrel.

Hoses are made by extruding a tube of uncured rubber, applying a layer of reinforcement filaments over the tube, covering this reinforcement layer with a second uncured rubber layer, and thereafter curing under heat and pressure to consolidate and harden the structure. Often there are two layers of reinforcement filaments, for example braided or in a multiple spiral arrangement, separated by an additional layer of uncured rubber. Usually moreover the rubber is extruded around and supported by a mandrel to preserve its internal diameter. When this mandrel is flexible, for example made of flexible polymeric material, the hose can be supported on the mandrel throughout manufacture since the mandrel can be coiled to permit long lengths of hose to be vulcanized.

A problem in the above method of manufacture is exudation of some of the uncured tube through the interstices of the reinforcement filaments when the hose is heated up during the curing cycle. The exuded material forms excrescences on the outside of the braid, and depending upon the size of the excrescences and the thickness of the cover under which they have formed may cause a pimpled appearance on the hose surface and thus spoil the appearance of the hose.

The cause of this exudation is primarily greater thermal expansion of the organic material confined within (i.e. beneath) the braid compared with that of the braid itself. In the case of a wire braid, the expansion of the rubber within the braid is several times greater than the expansion of steel wire. Also, a synthetic textile braid tends to shrink (not expand) when heated so causing compression of the underlying rubber at the very time the rubber is attempting to expand. This shrinkage is due to residual stresses in the yarn resulting from its method of manufacture. Also, the polymeric mandrel will expand to some extent during the curing stage. The combination of rubber and/or polymer expansion and possible yarn shrinkage due to heat results in tube material being extruded between the braid or reinforcing material, even if more than one braided layer is present.

To overcome or alleviate this disadvantage, the present invention consists in a method of manufacturing a hose or like structure wherein a layer of uncured rubber supported on a mandrel is surrounded by reinforcement filaments and thereafter vulcanized, in which method recesses are provided in the surface of the uncured rubber beneath the reinforcement filaments to accommodate expansion of the mandrel and/or expansion of the uncured rubber and/or shrinkage of the filaments and thereby prevent rubber from being exuded above the reinforcement filaments on curing.

Such recesses are preferably grooves. It is easier to provide longitudinal extending grooves, that is to say, grooves located in the extrusion direction and formed during extrusion of the initial layer around the mandrel. The spacing and dimensions of these grooves can be predetermined having regard to the nature of the reinforcement filaments, mandrel, rubber, and heating cycle. The grooves can be of any cross-section, for example square, U-shaped, heart-shaped, or V-shaped. The V-shaped cross-section is preferred since it is most readily filled on expansion of the rubber without trapping in air.

More than one layer of reinforcement filaments, separated by an additional layer of uncured rubber can be provided.

Usually only the lowest layer of rubber, but possibly both or all rubber layers can be suitably recessed.

The reinforcement filaments can be braided or wound as multiple spirals and can for example be metal wires or polymer filaments. Optionally special braid techniques can be used when winding over a recessed surface. Alternatively a specially hard rubber or a freezing stage immediately prior to braiding can be used.

The invention also extends to a hose or like structure manufactured by the method described above.

The invention will be further described with reference to the accompanying drawings, in which:

FIG. 1 shows an exploded perspective view of a prior art braided tube on a mandrel and shows "popping" or exudation of the rubber layers through the braid.

Figure 2A:
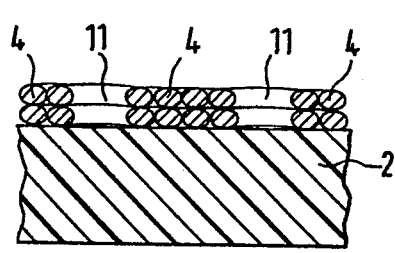
Figure 2B:
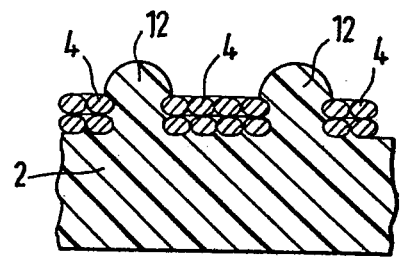
Figure 3A:
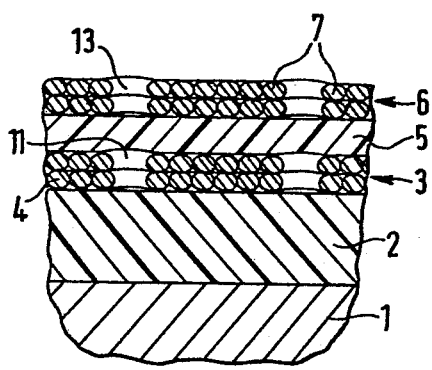
Figure 4A:
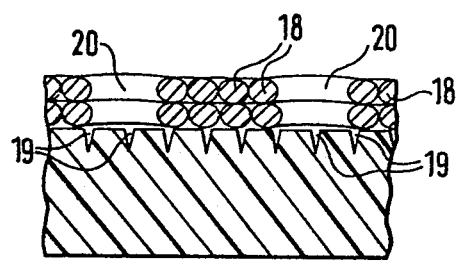
Figure 4B:
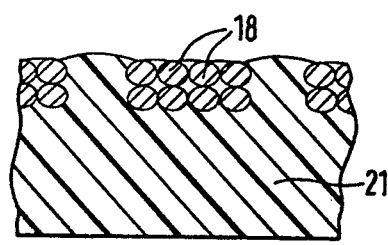

FIGS. 2a and 2b show in diagrammatic longitudinal section part of a hose wall with a single braided reinforcement as in the prior art, before and after curing respectively, FIGS. 3a, b and c also show in diagrammatic longitudinal section part of a hose wall but with two layers of braided reinforcement according to the prior art before, during, and after curing on a mandrel respectively, FIGS. 4a and 4b are similar to FIGS. 2a and 2b but with the elastomer tube modified in shape according to the present invention.

Figure 5:
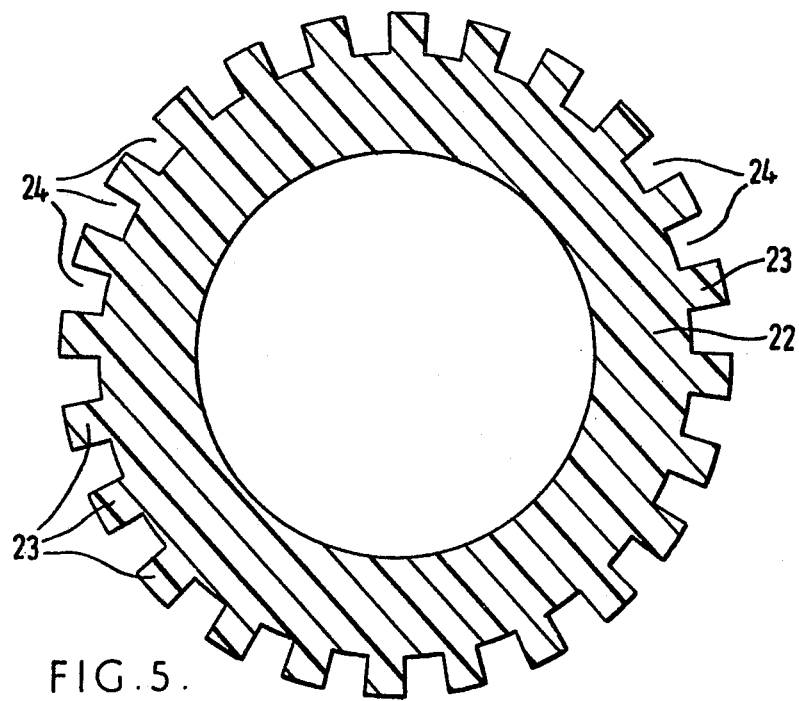
Figure 6A:
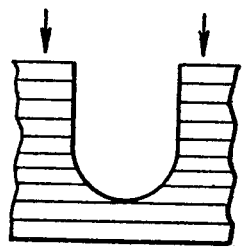
Figure 6B:
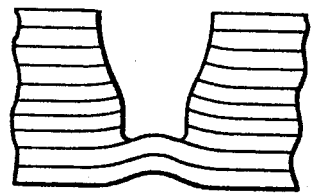
Figure 6C:
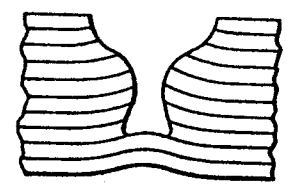
Figure 7A:
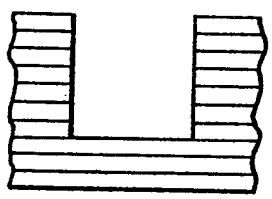
Figure 7B:
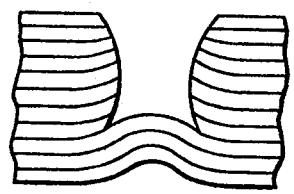
Figure 7C:
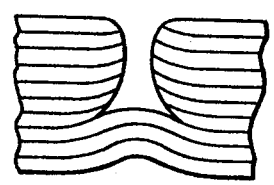
Figure 8A:
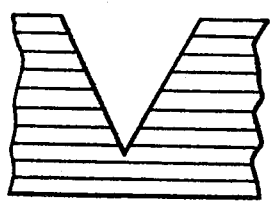
Figure 8B:
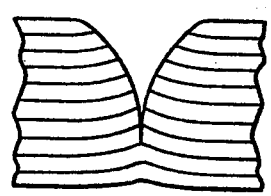
Figure 8C:
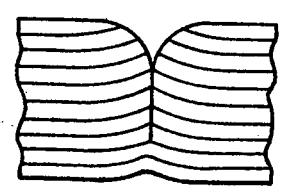

FIG. 5 shows a transverse cross-section of a tube of modified shape according to the invention, FIGS. 6a to 6c show in cross-section the deformation of a U-shaped groove in a rubber layer under load, FIGS. 7a to 7c show in cross-section the deformation of a square-shaped groove in a rubber layer under load, and FIGS. 8a to 8c show in cross-section the deformation of a V-shaped groove in a rubber layer under load.

FIG. 1 shows a common prior art hose still supported on a flexible mandrel after curing.

A flexible polymeric mandrell (made for example of ethylene-propylene rubber, styrene-butadiene rubber, poly-propylene, or nylon) is surrounded by an extruded rubber tube 2 on which is wound a layer 3 of reinforcement filaments as flat braided groups of filaments 4. Around this again is a second layer of extruded rubber 5, the so-called "friction layer", itself surrounded by a second layer of filaments 6 consisting of braided flat groups of filaments 7. A final cover layer of rubber 8 is located around this braid.

The disadvantage of this prior art construction is that thermal expansion of the internal rubber layers and/or of the mandrel during curing can force the soft rubber of layers 2 and 5 to exude through gaps in the braid 4 or 7 respectively. This exudation phenomenon is called "popping" and results in little excrescences of rubber as shown at 9 in FIG. 1 leading to a pimply hose surface on the final cover layer as shown at 10.

FIGS. 2a and 2b show shows this phenomenon in more detail as arising in a single layer e.g. layer 2 of FIG. 1. FIG. 2a shows the section before curing. On heating to cure the rubber, layer 2 expands through gap 11 between the flat groups 4 of braid to form a permanent excrescence as shown at 12 in FIG. 2b.

Figure 3B:
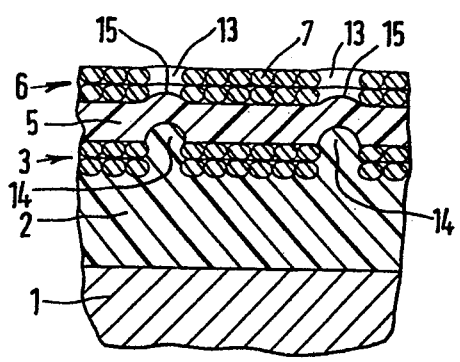
Figure 3C:
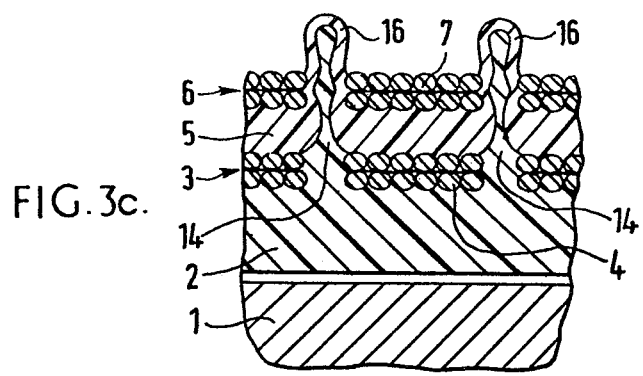

FIGS. 3a, 3b and 3c show the same phenomenon as taking place in a two-layer braid. In this instance curing is shown as taking place on a mandrel 1 which supports the successive layers 2, 3, 5 and 6. Layer 3 consists of flat groups of braided filaments 4 and layer 6 consists of similar flat groups 7. Between the flat groups 4 are left spaces 11 as shown in FIG. 3a and between the flat braided groups 7 are left spaces 13 as shown in FIGS. 3a and 3b.

When a hose of such a structure is vulcanized on the mandrel, both the layer 2 and the mandrel itself expand. As a consequence, the rubber is forced up through gaps 11 to form bulges 14 which deform the friction layer 5 so as to force it slightly upwards as at 15 to occupy part of the space of gap 13. By the time vulcanization is completed, the material shown in the bulges 14 has forced its way to the surface through gaps 11 and gaps 13, carrying with it a cover layer of the friction material 5 to form excrescences 16, corresponding to those shown at 9 in FIG. 1.

In the simplified and diagrammatic drawings of FIGS. 3a, 3b and 3c, the gaps between the braid are shown as being coaxial; in practice, even if they are not, there is a transmission of pressure throughout the various layers. The upshot is the same in that the excrescences 9 or 16 are formed, especially where the flat groups 7 of the reinforcement 6 intersect as in the locations shown at 9 in FIG. 1.

It should be noticed that in FIG. 3c, although the mandrel after vulcanization and cooling returns to its original dimensions, the rubber is by this time hard and vulcanized and cannot withdraw from the various gaps 13 and 11.

FIG. 4a shows a rubber layer 17 over which a number of flat groups 18 of a braided reinforcement are wound. The soft and vulcanized rubber layer 17 is provided at its surface with a plurality of V-shaped grooves 19. By suitable dimensioning of the grooves it is possible to arrange that all of the increase in volume of the rubber layer 17 can be accommodated by the gaps 20 between the groups 18 and by the spaces in the grooves 19. Thus, after vulcanization of the structure shown in FIG. 4a a vulcanized product as shown in FIG. 4b is achieved in which the vulcanized rubber layer 21 extends up within the braid 18 but not significantly above its surface, merely filling gaps 20.

FIG. 5 shows a transverse cross-section of part of a hose equivalent to layer 17 in FIG. 4a. Such a transverse section can be made by extruding the rubber composition through a suitably shaped die around a mandrel. As will be clear from FIG. 5, the profile comprises a main body of vulcanizable rubber 22 and a number of ribs 23 running along the extrusion which leave square-section grooves 24 between them. It is more convenient to make such an extruded body of material with longitudinal ribs and grooves than it is to form transverse grooves around the hose prior to winding the braid.

The grooves to be formed in the vulcanizable rubber can have various cross-sectional shapes. As shown in FIGS. 6a, 6b and 6c, increasing vertical load on a layer of rubber with a U-section groove in it deforms the groove eventually to a shape somewhat shown as in FIG. 6c. (This is effectively equivalent to holding the layer in an enclosure of fixed size (i.e. between the braid and the mandrel) and allowing it to expand during the heating necessary to vulcanize the rubber).

FIGS. 7a, 7b and 7c show successive stages of deformation when a vertical load is applied to a layer of rubber containing a square-section groove. Similarly, FIGS. 8a, 8b and 8c show the successive deformation of an article containing a V-section groove.

From a comparison of FIGS. 6c, 7c and 8c, it will be seen that a more or less V-section groove is preferable insofar as successive deformation of the groove does not tend to entrap air at the base. FIGS. 6c and 7c, if deformed further, would have such a tendency to trap air and thus lose effective space which could otherwise be taken up by the rubber.

While certain representative embodiments and details have been shown for the purpose of illustrating the invention, it will be apparent to those skilled in this art that various changes and modifications may be made therein without departing from the spirit or scope of the invention.

I claim:

1. A method of making a mandrel supported hose such as to accomodate expansion and contraction of various of the elements comprising the hose structure during vulcanization and prevent the elements from exuding to the outer surface and impairing the surface appearance thereof, comprising the steps of:
   A. forming a plurality of regularly spaced longitudinal recesses in the outward facing surface of an uncured, mandrel-supported, rubber tube by extruding the tube through a die opening having a configuration of the recesses;
   B. applying a layer of reinforcement filaments over the tube;
   C. extruding a layer of uncured rubber over the reinforcement layer; and
   D. vulcanizing the composite structure, said recesses providing necessary expansion space for the rubber as it tends to move radially outward upon being vulcanized.

2. A method as claimed in claim 1 in which the recesses are spirally oriented grooves.

3. A method as claimed in claim 1 in which the recesses are of V-shaped section.

4. A method as claimed in claim 1 in which the reinforcement filaments are braided or wound as multiple spirals.

5. A method as claimed in claim 1 in which at least one additional layer of reinforcement filaments separated by an additional layer of uncured rubber is present in the structure.

6. A method as claimed in claim 5 in which only the innermost layer of uncured rubber has longitudinal recesses.

7. A method as claimed in claim 5 in which all of the layers of rubber have longitudinal recesses.

* * * * *